US012669799B2

(12) United States Patent
Delautier et al.

(10) Patent No.: US 12,669,799 B2
(45) Date of Patent: Jun. 30, 2026

(54) SUPERVISION METHOD AND SYSTEM FOR PREDICTING DEFECTS DURING ADDITIVE MANUFACTURING PROCESSES

(71) Applicant: BULL SAS, Les Clayes Sous Bois (FR)

(72) Inventors: Sébastien Delautier, Tournefeuille (FR); Jérémy Vincent, Colomiers (FR)

(73) Assignee: BULL SAS, Les Clayes Sous Bois (FR)

( * ) Notice: Subject to any disclaimer, the term of this patent is extended or adjusted under 35 U.S.C. 154(b) by 372 days.

(21) Appl. No.: 18/378,784

(22) Filed: Oct. 11, 2023

(65) Prior Publication Data

US 2024/0126235 A1      Apr. 18, 2024

(51) Int. Cl.
*B33Y 50/02* (2015.01)
*G05B 19/4099* (2006.01)

(52) U.S. Cl.
CPC .. *G05B 19/4099* (2013.01); *G05B 2219/2646* (2013.01)

(58) Field of Classification Search
CPC ...................................................... B33Y 50/02
See application file for complete search history.

(56) References Cited

U.S. PATENT DOCUMENTS

| | | | | |
|---|---|---|---|---|
| 2019/0389137 A1* | 12/2019 | Frohnmaier | ............ | B22F 10/38 |
| 2021/0365016 A1* | 11/2021 | Hasanian | ............... | G01N 29/14 |
| 2022/0042924 A1* | 2/2022 | Beckett | ................... | B22F 10/38 |

FOREIGN PATENT DOCUMENTS

| | | | | | |
|---|---|---|---|---|---|
| CN | 206794757 U | * | 12/2017 | | |
| EP | 3459715 A1 | * | 3/2019 | ............. | B22F 10/38 |
| EP | 3646968 A1 | * | 5/2020 | ............. | B33Y 50/02 |
| EP | 4299290 A1 | * | 1/2024 | ............. | B33Y 50/02 |
| KR | 20160050794 A | * | 5/2016 | ........... | B29C 64/393 |

OTHER PUBLICATIONS

European Search Report for corresponding EP Application No. 22201689, dated Mar. 29, 2023.
Razvi et al., "A review of Machine Learning Applications in Additive Manufacturing", 39th Computers and Information in Engineering Conference, vol. 1, pp. 1-10, Aug. 18, 2019.

* cited by examiner

*Primary Examiner* — Suresh Suryawanshi
(74) *Attorney, Agent, or Firm* — Meagher Emanuel Laks Goldberg & Liao

(57) ABSTRACT

Method for supervising an additive manufacturing process performed by an additive manufacturing device (1), comprising
providing a set of data to a supervision system (6), said set of data comprising product geometry data, production data, production history data, and measurements (7) from said additive manufacturing device (1), and, at said supervision system (6):
predicting the occurrence of a defect (S1) from said set of data,
when an occurrence of a defect is predicted, determining a type of defect (S2), and deciding for stopping (8, 5) or not (S3) said additive manufacturing process according to said type of defect and of a seriousness level.

9 Claims, 1 Drawing Sheet

SUPERVISION METHOD AND SYSTEM FOR PREDICTING DEFECTS DURING ADDITIVE MANUFACTURING PROCESSES

TECHNICAL FIELD

The invention relates to the field of additive manufacturing, or additive layer manufacturing. In particular, it concerns the supervision of additive manufacturing process to anticipate defects during the process.

BACKGROUND

Additive manufacturing (AM), also known as additive layer manufacturing (ALM) encompasses various processes in which material is joined or solidified under computer control to create a three-dimensional object, with material being added together (such as liquid molecules or powder grains being fused together).

The manufactured objects can be of almost any shape or geometry and typically are produced using digital model data from a 3D model.

In many fields such as aeronautics, aerospace, automotive, etc., the quality of the products produced by additive manufacturing must be irreproachable. Numerous standards govern this quality requirements like the AS/EN9100 series of standards, which are inspired by the ISO 9001 standard about quality management. In order to comply with the standards in these areas, manufacturers must, among other things, set up a system for monitoring the surface quality of manufactured parts on a regular basis. The repercussions in case of non-conformities can be numerous and more or less serious, ranging from the decrease of the brand image for the company at the origin of the defect to technical problems that may lead to various accidents.

Several propositions have been made to automate the quality control of produced products or parts. Generally speaking, however, these propositions are limited to certain types of defects only, and/or aims in only detecting defects once they happen. In the latter case, the manufactured product would be discarded, leading to loss of both time and resources (materials, wear of the manufacturing device, etc.) and in some case damages to the manufacturing device.

SUMMARY

A method and a system for predicting defects before they actually happen would thus be useful, in order, for instance to stop the manufacturing process to save time and resources, or trigger corrective actions so as to avoid the predicted defect to actually take place.

In a first example embodiment, it is proposed a method for supervising an additive manufacturing process performed by an additive manufacturing device, this method comprising providing a set of data to a supervision system, said set of data comprising product geometry data, production data, production history data, and measurements from said additive manufacturing device, and, at said supervision system:

predicting the occurrence of a defect from said set of data, when an occurrence of a defect is predicted, determining a type of defect, and deciding for stopping or not said additive manufacturing process according to said type of defect and of a seriousness level.

This embodiment may comprise other features, alone or in combination, such as:

deciding for stopping or not said additive manufacturing process is realized by a predictive model selected according to said type of defect.

the method further comprises triggering at least one correction action according to said type of defect, said at least one correction action comprising a command transmitted to said additive manufacturing device.

said command replaces an initial command from an additive manufacturing pilot module intercepted by said supervision system.

triggering at least one correction action is realized by a predictive model selected according to said type of defect.

the method further comprises a preliminary step for detecting defects before starting said additive manufacturing process according to a subset of said set of data comprising product geometry data, production data, production history data.

predicting the occurrence of a defect comprises predicting a future occurrence of a defect.

In a second example embodiment, it is proposed a computer readable medium encoding a machine-executable program of instructions to perform a method according as previously defined.

In another example embodiment, it is proposed a supervision system for supervising an additive manufacturing process performed by an additive manufacturing device, comprising means for receiving a set of data, said set of data comprising product geometry data, production data, production history data, and measurements from said additive manufacturing device, and, means for predicting the occurrence of a defect from said set of data, means for, when an occurrence of a defect is predicted, determining a type of defect, and deciding for stopping or not said additive manufacturing process according to said type of defect and of a seriousness level.

In still another example embodiment, it is proposed a system comprising a supervision system according as previously defined and said additive manufacturing device.

BRIEF DESCRIPTION OF THE FIGURES

Some embodiments are now described, by way of example only, and with reference to the accompanying drawings, in which:

The FIG. 1 schematically illustrates an overview of an additive manufacturing process according to embodiments of the invention.

Figure 2:
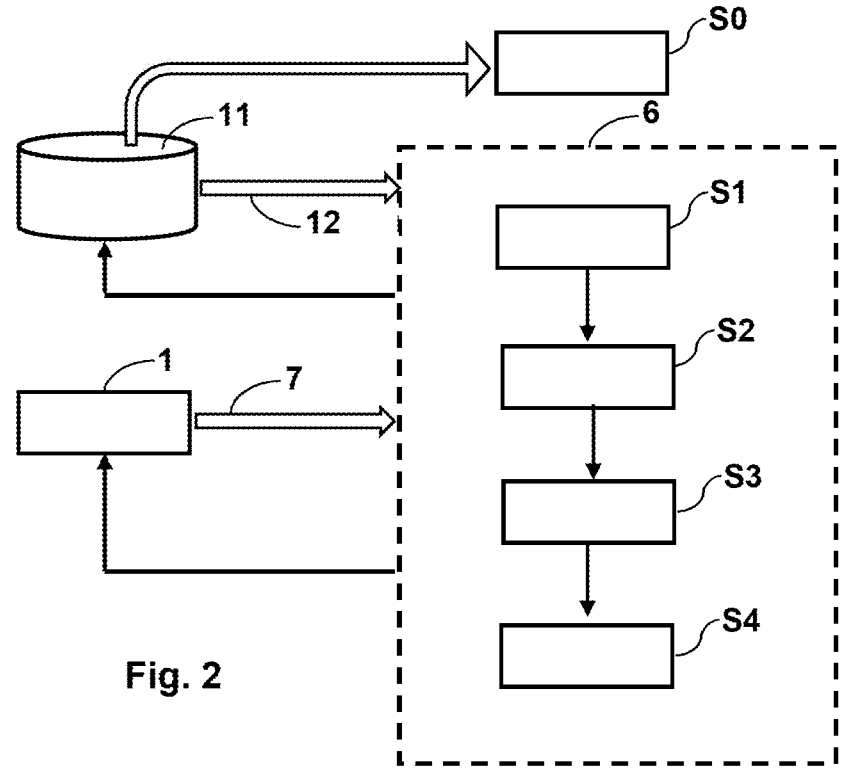

The FIG. 2 schematically illustrates an organigram of a method performed by a supervision system according to embodiments of the invention.

DESCRIPTION OF EMBODIMENTS

Figure 1:
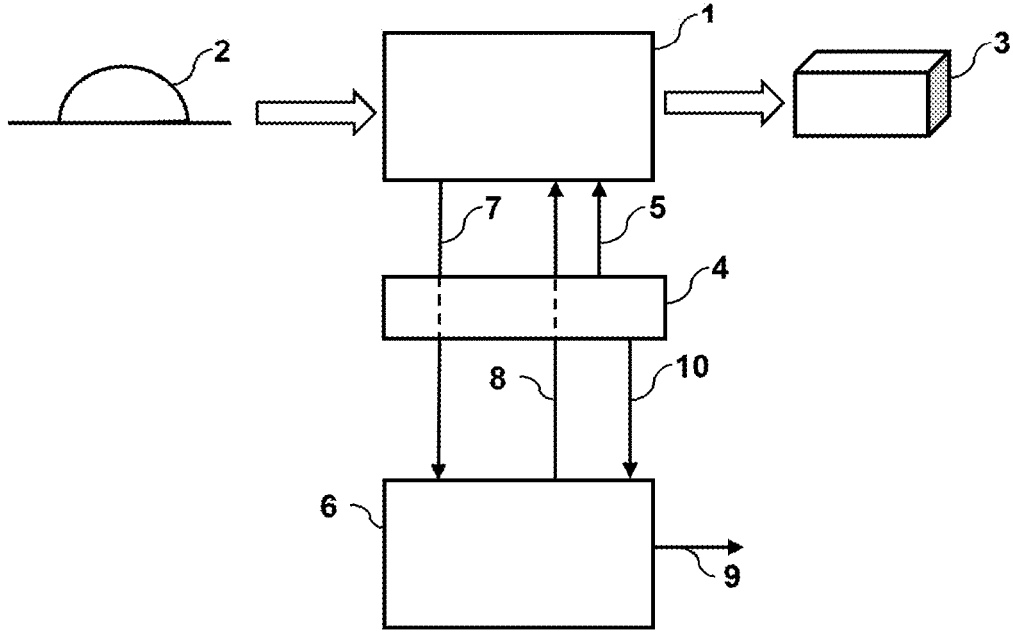

In reference to FIG. 1, raw materials 2, like metallic alloys, are provided to an additive manufacturing device, or machine, 1.

According to a production file, the additive manufacturing (AM) device 1 produces a product, or part, 3. In the following, the term "product" means any tangible object produced by the additive manufacturing device 1. It can be a final product itself, or a part of a final product.

The product 3 to be produced is defined by geometry data and production data. Geometry date defines the static design of the object to be produced. It may be a CAD (Computer-Assisted Design) file.

The production data provides instructions for the additive manufacturing device 1 to produce the product 3. For example, it specifies to the motors of the AM device 1 where to move, how fast to move, and what path to follow.

The production data may for instance be a g-code file. G-code (also RS-274) is the most widely used computer numerical control (CNC) programming language. It is used mainly in computer-aided manufacturing to control automated machine tools and has many variants.

An additive manufacturing pilot module 4 may be provided to pilot the automatic manufacturing device 1. This pilot may be embedded into the AM device 1 itself or remote and exchanging with it through provided interfaces. The AM pilot module 4 may be in charge of reading and parsing the geometric data and the production data and to transmit flows of commands 5 to the AM device 1, according to these data.

The additive manufacturing machine 1 may be of a model known in art or still to be developed.

ISO/ASTM52900-15 defines, so far, seven categories of Additive Manufacturing processes within its meaning: binder jetting, directed energy deposition, material extrusion, material jetting, powder bed fusion, sheet lamination, and vat photopolymerization According to embodiments, the additive manufacturing device 1 may be based on powder bed fusion technique. Powder Bed Fusion techniques, or PBF, include several processes such as DMLS, SLS, SLM, MJF and EBM. Powder Bed Fusion processes can be used with an array of materials and their flexibility allows for geometrically complex structures.

In particular, according to embodiments, the AM device 1 may use Selective Laser Melting technique (SLM), also known as direct metal laser melting (DMLM) or laser powder bed fusion (LPBF). SLM is a rapid prototyping, 3D printing, or additive manufacturing technique designed to use a high power-density laser to melt and fuse metallic powders together.

According to the invention a supervision system 6 is further provided. This supervision system may be connected with the pair AM device 1/AM pilot module 4 by conventional technical means, either wired or wireless (Bluetooth, Wi-Fi . . . ).

The supervision system 6 has interfaces allowing receiving measurements 7 from the AM device 1. These measurements can be provided from the internal status of the AM device 1 or from various probes within or connected to the AM device 1.

Measurements comprise temperature measurements (head and bed), speed and acceleration of the laser emitter, extrusion strength, images and videos from cameras monitoring the AM process, etc. All these measurements can be provided on the flow and capture the instantaneous status of the dynamic process. The supervision system 6 may thus be adapted to continuously receive these measurements 7 from the AM device 1.

According to the invention, the supervision system 6 can decide to stop or not the additive manufacturing process.

It may be adapted to transmit commands or any other data 8 to the additive manufacturing device 1, potentially through the AM pilot module 4.

Such commands or information may aim in stopping the AM process, when a serious enough defect is predicted.

According to embodiments, some corrective actions may be triggered, which comprise a (or more) command(s) transmitted to the AM device 1 (potentially through the AM pilot module 4). Such a situation may happen if the supervision system 6 predicts a defect but determines that this defect can still be avoided by transmitting appropriate commands to the AM device 1. In particular, initial commands 5 from the AM pilot module 4 may be intercepted and replaced by new commands determined by the supervision system 6. These commands may override the initial commands 5.

Furthermore, an alerting mechanism can be put in place to inform or alarm human operators that a defect is predicted. Appropriate data 9 can be provided by the supervision system 6 and transmitted to a human-machine interface, comprising information that a defect is detected, and related information (type of defect, seriousness of the defect, possible corrective actions, etc.)

It can be noticed that a data flow can be continuously provided to human operators, for instance as a display of prediction features. The alert distinguishes over this continuous flow in that it is configured to positively alarm the human operator (e.g. by displaying figures in red colour, by producing a sound, etc.)

FIG. 2 describes more precisely the supervision method.

The method step S1, S2, S3, S4 may correspond to modules of a software functional architecture of a supervision system, bearing in mind that in a software architecture, these modules may be independent software programs/processes or parts of a global software program.

According to embodiments, an additional and preliminary module/step S0 may be provided for detecting defects before the start of the additive manufacturing process. In other words, it aims to check ab initio whether a defect can be predicted even before the AM process is triggered, i.e. on the sole basis of static data (geometry data, production data, and production history data).

Thanks to predictive models, it is possible to determine if a product can or cannot be manufactured. If yes, then the manufacturing process can be triggered. On the opposite, an alarm can be triggered, and the process may stop.

These predictive models may be machine learning models and/or decision trees based on production history constraints, etc.

In the case of Fused Deposition Modeling (one sub type of Additive Manufacturing process), production constraints can be for example: when the temperature is higher than 220° and the fan speed is below 50%, there will be collapsing, or when the bed temperature is lower than 60° and the head speed is higher than 70 mm/s, there will be no sticking to bed defect.

Once the manufacturing process is triggered, the supervision system 6 starts receiving a set of data through interfaces. This set of data encompasses static data 12 and measurements 7.

Static data 12 may be provided by a data repository 11, which can gather data from different sources. The static data 12 comprise product geometry data, production data and production history data.

The production history data comprises organized data from past manufactured products, associating for the latter product geometry data, production data, measurements and information relating to defects determined by the supervision system 6 during the manufacturing.

These data are called "static data" because they are not supposed to evolve during the manufacturing process. On the opposite, the measurements 7 are live data, since they do evolve during the manufacturing process and need thus to be acquired regularly from various measurements means, or probes. The supervision system 6 may thus be adapted to continuously receive measurements 7 from the additive manufacturing device 1.

Continuously here means that the measurements may be acquired on a regular basis, according to a static or dynamic sample rate. This sample rate shall be set so that the acquired measurements really track the physical phenomenon happening at the additive manufacturing device 1. This sample rate and the way measurements may be acquired may thus depend on the nature of the underlying physical phenomenon (temperature, pression, video . . . ).

Steps S1-S3 (or S1-S4) performed by the supervision system 6 are typically an iterative process. They are iteratively performed based on time windows or bundle of measurements 7 data. At each iteration, new measurements 7 are fed to the supervision system 6 and the determinations made by the various steps/modules S1-S4 are renewed. The succession of these steps shall be short enough to allow rapid iterations allowing to track the dynamic nature of the physical process happening at the additive manufacturing device 1 and allowing a reaction on any detected defect as early as possible.

The functional architecture and method according to the invention is designed and optimized to meet this expectation, especially by organizing the supervision process as a succession of sub-decisions, each of which allowing better treatment of the next ones by choosing adapted predictive models.

Furthermore, the first one (S1) is conditional for the subsequent ones and allows thus to cut off major computer burden in the case no defect is detected (which is statistically a vast majority of the situations).

Step S1 comprises predicting the occurrence of a defect from the provided set of data 7, 12.

This step aims in detecting whether a defect has already happened or will happen. In other words, according to embodiments, predicting the occurrent of a defect comprises predicting a future occurrence of a defect, i.e. that will happen. Some additional information may be further determined, especially about the timeframe (past or future) in which the defect is detected.

Example of output may be like "based on the last 10 seconds, there was a defect within timeframe X", or "there will be a defect in the next X timeframe" (where X precises further the impacted timeframe).

The prediction of the occurrence of defects, performed in step S1, may be based on predictive models, like e.g. convolutional neural networks, decision tree, random forest, RCNN (Region based Convolutional Neural Network), etc.

The predictive models may be tuned by supervised training with manual labeling specifying whether a defect has happened or will happen within a given timeframe.

If the occurrence of a defect is predicted (in a past or future timeframe), subsequent steps may be triggered. Otherwise, the step S1 simply looks back to handle next measurements and time frame for performing new predictions.

This step S1 is designed to be as efficient as possible, so as to avoid more complex algorithm tasks of classification of the defect, determination on whether to stop or not, etc., since in most iterations, no defect is detected.

So, when an occurrence of defect is predicted, a step S2 comprises determining a type of defect.

For example, the output of this step S2 may be a binary output for each type of possible defect.

In the case of Fused Deposition Modeling, types of defects may comprise "not sticking to bed", "warping", "not extruding", etc.

The predictive models may be of different sorts, including LSTM (Long Sort-Term Memory), recurrent neural network, or autoencoder. The predictive models may be tuned by supervised training with manual labeling specifying the type of defect which has happened or will happen.

The predictive model is a different one from the predictive model of the previous step S1. Although they may be of a same type, according to embodiments, the invention allows to have specialized predictive models for each step performed by the supervision system 6, allowing a fine-tuned adaptation to the task to handle, and a globally better efficiency.

Subsequently to step S2 (and also conditioned by the prediction of the occurrence of a defect, in step S1), a step S3 comprises deciding on whether to stop or not the undergoing additive manufacturing process.

Predictive models may be used for such decision. Machine-learning predictive models and/or decision trees based on production history constraints may be used as predictive models.

The decision may be further based on a list of seriousness levels for each type of defect.

According to embodiments, a particular predictive model may be selected according to the type of defect. This allows better adaptation of the predictive model to the type of defect that is considered. So, once again, the organization of the supervision process as a succession of sub-steps allows finer tuning of the tasks to be performed.

A possible output of the predictive model could be whether the defect is serious enough (major defect) or not to stop the additive manufacturing process.

In this case, some commands may be transmitted to the additive manufacturing device 1. This command 8 may be transmitted directly to the AM device 1 or through the additive manufacturing pilot module 4.

Such early stop of the AM device 1 allows to avoid loss of time and resources (raw materials) since the resulting product 3 shall be discarded. It may also allow avoiding extra wear of the AM device 1 and possible damage as in some cases major defects may impact the AM device 1 itself.

In case the defect is not such a major defect, the supervision system 6 can decide to go on the additive manufacturing process.

In such case and according to embodiments, a step S4 may be initiated for triggering at least one corrective action according to the determined type of defect. The corrective action(s) comprise(s) a command transmitted to the additive manufacturing device 1, directly or through the AM pilot module 4.

According to embodiments, such a command may replace the initial command 5 transmitted by the AM pilot module 4 to the AM device 1. For doing so, this initial command 5 is intercepted by the supervision system 6. This allows to avoid any discrepancies between commands from the AM pilot module 4 and from the supervision system 6.

The corrective action(s) may be determined by a set of predictive models, like machine-learning models and/or decision trees based on production history constraints.

According to embodiments, a particular predictive model may be selected according to the type of defect.

The corrective actions aim in modifying the printing parameters of the AM device 1 so as to avoid, or substantially reduce, the detected defect or its effects. For instance, the corrective actions may be commands for lowering the temperature, accelerating the speed, etc.

At various stage of the whole supervision process, the outputs of the prediction models can be stored in the data repository 11, so as to integrate into the production historical data.

The invention shall not be limited to the example embodiments explained above but is rather defined by the claims.

What is claimed is:

1. A method for supervising an additive manufacturing process performed by an additive manufacturing device, said method comprising:

receiving a set of data by a supervision system, said set of data comprising product geometry data, production data, production history data, and measurements from said additive manufacturing device, wherein the production history data comprises organized data from past manufactured products, associating for said past manufactured products, product geometry data, production data, measurements and information relating to defects determined by the supervision system during the additive manufacturing process; and, iteratively performing at said supervision system, an iteration corresponding to measurements related to a past timeframe fed to the supervision system;

predicting an occurrence of a defect comprising predicting a future occurrence of a defect within a future timeframe from said set of data, based on a predictive model tuned with a supervised training dataset comprising manual labels specifying whether a defect has happened or will happen within a given timeframe;

when the occurrence of the defect is predicted, determining a type of defect, based on a predictive model tuned with a supervised training dataset comprising manual labels specifying the type of defect that has happened or will happen within a given timeframe; and deciding for stopping or not said additive manufacturing process according to said type of defect and of a seriousness level for said type of defect, using a predictive model based on production history constraints.

2. The method according to claim 1, further comprising triggering at least one correction action according to said type of defect, said at least one correction action comprising a command transmitted to said additive manufacturing device.

3. The method according to claim 2, wherein said command replaces an initial command from an additive manufacturing pilot module intercepted by said supervision system.

4. The method according to claim 2, wherein triggering at least one correction action is realized by a predictive model selected according to said type of defect.

5. The method according to claim 1, further comprising a preliminary step for detecting defects before starting said additive manufacturing process according to a subset of said set of data comprising product geometry data, production data, production history data.

6. The method according to claim 5, wherein predicting the occurrence of a defect comprises predicting a future occurrence of a defect.

7. A non-transitory computer readable medium encoding a machine-executable program of instructions to perform a method according to claim 1.

8. A supervision system for supervising an additive manufacturing process performed by an additive manufacturing device, comprising:

an interface for receiving a set of data, said set of data comprising product geometry data, production data, production history data, and measurements from said additive manufacturing device wherein the production history data comprises organized data from past manufactured products, associating for said past manufactured products, product geometry data, production data, measurements and information relating to defects determined by the supervision system during the additive manufacturing process;

a processor and a memory storing instructions that, when executed by the processor, cause the supervision system to iteratively perform, an iteration corresponding to measurements related to a past timeframe fed to the supervision system:

for a prediction module configured to predict an occurrence of a defect configured to predict a future occurrence of a defect within a future timeframe from said set of data based on a predictive model tuned with a supervised training dataset comprising manual labels specifying whether a defect has happened or will happen within a given timeframe; and a defect determination module configured to, when the occurrence of the defect is predicted, determine a type of defect, based on a predictive model tuned with a supervised training dataset comprising manual labels specifying the type of defect that has happened or will happen within a given timeframe; and a decision module configured to decide for stopping or not said additive manufacturing process according to said type of defect and of a seriousness level for said type of defect, using a predictive model based on production history constraints.

9. A system comprising:

an additive manufacturing device; and a supervision system according to claim 8 configured to supervise an additive manufacturing process performed by said additive manufacturing device.

* * * * *